(12) United States Patent
Tobo et al.

(10) Patent No.: US 6,530,207 B2
(45) Date of Patent: Mar. 11, 2003

(54) GAS TURBINE SYSTEM

(75) Inventors: Masayuki Tobo, Kawasaki (JP); Haruo Oguchi, Yokohama (JP); Hajime Yasui, Tokyo (JP); Akira Hasegawa, Yokohama (JP)

(73) Assignees: Kabushiki Kaisha Toshiba, Tokyo (JP); Toshiba Engineering Corporation, Kawasaki (JP)

( * ) Notice: Subject to any disclaimer, the term of this patent is extended or adjusted under 35 U.S.C. 154(b) by 17 days.

(21) Appl. No.: 09/940,426

(22) Filed: Aug. 29, 2001

(65) Prior Publication Data

US 2002/0029557 A1 Mar. 14, 2002

(30) Foreign Application Priority Data

Aug. 30, 2000 (JP) ........................................ 2000-261154

(51) Int. Cl.[7] ................................................. F02C 9/28
(52) U.S. Cl. .................................. 60/39.091; 60/39.281
(58) Field of Search ............................. 60/779, 39.091, 60/39.281, 737, 39.182; 431/22

(56) References Cited

U.S. PATENT DOCUMENTS

| | | | | |
|---|---|---|---|---|
| 5,327,718 A | * | 7/1994 | Iwata et al. | 60/773 |
| 6,003,296 A | * | 12/1999 | Citeno et al. | 60/772 |
| 6,026,644 A | * | 2/2000 | Ito et al. | 60/737 |
| 6,260,350 B1 | * | 7/2001 | Horii et al. | 60/39.3 |
| 6,363,330 B1 | * | 3/2002 | Alag et al. | 702/132 |

* cited by examiner

Primary Examiner—Ted Kim
(74) Attorney, Agent, or Firm—Oblon, Spivak, McClelland, Maier & Neustadt, P.C.

(57) ABSTRACT

A gas turbine system comprises an alarm signal calculation circuit, a shutdown calculation circuit and a flashback-error signal prevention calculation circuit. The alarm signal calculation circuit, the shutdown calculation circuit and the flashback-error signal prevention calculation circuit are integrated in a combustion monitoring device for monitoring combustion condition of combustion gas in a gas turbine-combustor.

13 Claims, 7 Drawing Sheets

GAS TURBINE SYSTEM

BACKGROUND OF THE INVENTION

The present invention relates to a gas turbine system, which permits to monitor occurrence of flashback of combustion gas on the basis of data of NOx concentration detected from the combustion gas.

A combined cycle power generation system has characteristic properties such as an improved plant thermal efficiency, a reduced start-stop time, decreased amounts of hot drainage and the like, which have been highly rated. The combined cycle power generation system has recently become one of the leading mainstreams of the latest thermal power plants.

The combined cycle power generation system is composed of a gas turbine system, a steam turbine system and a heat recovery steam generator in a tandem or single shaft arrangement, so that utilization of exhaust gas from the gas turbine system as heat source for the heat recovery steam generator causes the boiler to generate steam, and the thus generated steam is supplied to the steam turbine system to generate power. The exhaust gas from the gas turbine system can be utilized thoroughly, leading to a remarkably high plant thermal efficiency in comparison with the gas turbine system alone or the steam turbine system alone.

There has recently been made a reassessment of a gas turbine-combustor to be incorporated into the combined cycle power generation system having a high plant thermal efficiency, in view of prevention of pollution of the environment. Such a reassessment is made with an eye to monitoring of combustion condition of combustion gas and reduction in NOx concentration.

The former technical measures, i.e., to monitor the combustion condition of the combustion gas have conventionally been proposed. One of these measures is disclosed in Japanese Laid-Open Patent Publication No. SHO 53-82909.

Such a prior art exemplifies a gas turbine system alone as shown in FIG. 6. In the prior art, temperature of exhaust gas from an exhaust gas duct 2 of a gas turbine 1 is detected by means of a plurality of thermocouples 3. An intermediate temperature (i.e., a median temperature) is calculated from the detected temperatures. A comparison is made between the intermediate temperature and the individual temperatures actually detected. When deviation exists between the former and the latter, or the deviation exceeds a prescribed value, a combustion monitoring device 4 judges combustion condition of the combustion gas. In case where the combustion monitoring device judges the combustion to be "improper", it supplies an alarm signal ALM or an operation shutdown command TRP to a gas turbine control device 5 to control a fuel valve 6 so as to be opened or closed. The above-described prior art, which is based on a theory that abnormal combustion is always revealed as decrease in temperature of the exhaust gas, has been put to practical use.

Japanese Laid-Open Patent Publication No. SHO 59-134332 for example discloses the latter technical measures, i.e., to reduce the NOx concentration.

Such a prior art exemplifies a combined cycle power generation system as shown in FIG. 7, in which diffusion combustion is applied as a combustion system for a gas turbine-combustor 7. In the prior art, a NOx concentration sensor 10 is provided on the downstream side of a catalyst 9 of a heat recovery steam generator 8 in the flowing direction of the exhaust gas. A NOx concentration value signal P detected by means of the NOx concentration sensor 10 is compared with a predicted NOx concentration value signal Q from a NOx concentration predictor 11 integrated into a gas turbine control device 5, in an $NH_3$-injection control system 12 to make a calculation. On the basis of the calculation result, an amount of ammonia to be supplied is calculated. Ammonia is supplied in an amount thus calculated into, for example, an exhaust gas duct 2 connecting a gas turbine 1 and the heat recovery steam generator 8 with each other. In addition, a valve opening of a fuel valve 6 is controlled to adjust the flow rate of fuel, thus maintaining a low NOx concentration.

The technical measures as shown in FIGS. 6 and 7 concerning the monitoring of combustion condition of the combustion gas and the reduction in NOx concentration have already been put into practice, thus contributing prevention of the pollution of the environment. Especially, according to the technical measures as shown in FIG. 7, there is provided a high precision of prediction of the NOx concentration even with the use of calculation measures in case of a diffusion combustion, thus becoming one of the excellent measures in the field of art.

Gas turbine-combustors providing an extremely low NOx concentration have recently been demanded due to the further enhanced environmental regulation against the NOx concentration. With respect to such a demand, the diffusion combustion type gas turbine-combustors as shown in FIGS. 6 and 7 have already reached their limits. In view of this fact, dry type premixing lean combustion type gas turbine-combustors have alternatively been put into practice as service equipment.

According to the dry type premixing lean combustion, air is previously added into fuel to provide a lean-fuel condition and burned under such the lean-fuel condition to reduce a flame temperature, thus reducing the NOx concentration so as to completely conform to legally regulated values.

However, the dry type premixing lean combustion type gas turbine-combustors, which are excellent in reduction in the NOx concentration, even have some problems. One of these problems is a phenomenon of flashback (backfire) of the combustion gas.

The problem of flashback of the combustion gas is inherent in the dry type premixing lean combustion system. With respect to the flashback, sudden ignition occurs in a lean-fuel premixing zone, causing flame temperature to increase locally. As a result, there is generated the combustion gas having a high NOx concentration.

It is conceivable to apply the technical measures for calculation as shown in FIG. 7 to predict the NOx concentration from temperature distribution of the exhaust gas as the device for monitoring such a phenomenon.

However, flame of the flashback, which occurs in the lean-fuel premixing zone, then reaches the combustion zone to flow into flame in the combustion zone. It is difficult to judge increase in NOx concentration due to the flashback from the temperature distribution of the exhaust gas, even when the above-mentioned technical measures for calculation is applied. If the flashback is not detected, operation continues in the presence of the flashback, leading to a possible burnout accident of the gas turbine-combustor.

For these reasons, the realization has been demanded of the combustion monitoring device suitable for the dry type premixing lean combustion.

SUMMARY OF THE INVENTION

An object of the present invention, which has been made in view of the above-described problems, is therefore to provide a gas turbine system that makes it possible to surely detect a flashback of fuel gas in a gas turbine-combustor through NOx concentration of an exhaust gas measured.

This and other objects can be achieved according to the present invention by providing, in one aspect, a gas turbine system which comprises a compressor, a gas turbine-combustor, a gas turbine and a generator, which are operatively connected in series, a combustion monitoring device for detecting NOx concentration of an exhaust gas to be exhausted from the gas turbine so as to monitor combustion condition of the combustion gas in the gas turbine-combustor, and a gas turbine controller operatively connected to the combustion monitoring device and provided with a NOx value predictor, the combustion monitoring device comprising:

an alarm signal calculation circuit for operating an alarm signal based on the NOx concentration detected from the exhaust gas at a time when flashback of the combustion gas in the gas turbine-combustor occurs to reach a premixed combustion zone;

a shutdown calculation circuit for operating a shutdown command when the flashback grows into a prescribed scale; and a flashback-error signal prevention calculation circuit for compensating signal delay of the NOx concentration detected from the exhaust gas in accordance with a predicted NOx concentration value signal from the NOx value predictor.

In a preferred embodiment of this aspect, the alarm signal calculation circuit comprises a calculation element for comparing a real NOx concentration value signal detected from the exhaust gas with the predicted NOx concentration value with the NOx value predictor so as to make a calculation, a comparator for making a signal at a time when an operation signal from the calculation element exceeds a predetermined value, and an AND circuit for operating the alarm signal when the operation signal from the comparator coincides with an operation signal from the flashback-error signal prevention calculation circuit.

The shutdown calculation circuit comprises a calculation element for comparing a real NOx concentration value signal detected from the exhaust gas with the predicted NOx concentration value from the NOx value predictor so as to make a calculation, a comparator branching off from an output side of the calculation element for making a signal at a time when an operation signal from the calculation element exceeds a predetermined value, and an AND circuit for operating the shutdown command at a time when the operation signal from the comparator coincides with an operation signal from the flashback-error signal prevention calculation circuit.

The flashback-error signal prevention calculation circuit comprises a differentiator for making a calculation in response to a fuel gas valve control command from the gas turbine controller, a comparator for making a signal at a time when an operation signal from the differentiator exceeds a predetermined set value, and a timer for holding an operation signal from the comparator by a predetermined period of time.

Both the alarm signal from the alarm signal calculation circuit and the shutdown command signal from the shutdown calculation circuit are generated during a prescribed loaded operation.

The gas turbine controller is provided with an NH3 injection control system.

In a second aspect of the present invention, there is also provided a gas turbine system which comprises a compressor, a gas turbine-combustor, a gas turbine and a generator, which are operatively connected in series, a combustion monitoring device for detecting NOx concentration of an exhaust gas to be exhausted from the gas turbine so as to monitor combustion condition of combustion gas in the gas turbine-combustor, and a gas turbine controller operatively connected to the combustion monitoring device, the combustion monitoring device comprising:

an alarm signal calculation circuit for operating an alarm signal based on the NOx concentration detected from the exhaust gas at a time when flashback of the combustion gas in the gas turbine-combustor occurs to reach a premixed combustion zone;

a shutdown calculation circuit for operating a shutdown command at a time when the flashback grows into a prescribed scale; and a delay prevention calculation circuit for calculating NOx concentrations of a plurality of previous periods of all previous periods of a current NOx concentration detected from the exhaust gas so as to compensate signal delay of the current NOx concentration.

In a preferred embodiment of this aspect, the alarm signal calculation circuit comprises a calculation element for comparing the current NOx concentration value signal with the NOx concentrations of the previous periods calculated by the delay prevention calculation circuit to calculate a range of variation of a real NOx concentration, and a comparator for making a signal to send the alarm signal at a time when a calculated range of variation of the real NOx concentration exceeds a predetermined value.

The delay prevention calculation circuit is branched off from an output side of an inlet end of the alarm signal calculation circuit and is connected to the calculation element of the alarm signal calculation circuit.

The delay prevention calculation circuit includes a plurality of delay units for calculating NOx concentrations of a plurality of previous periods of all the previous periods of a current NOx concentration detected from the exhaust gas.

Both the alarm signal from the alarm signal calculation circuit and the shutdown command signal from the shutdown calculation circuit are generated during a prescribed loaded operation.

In a further aspect of the present invention, there is also provided a gas turbine system which comprises an air compressor, a gas turbine-combustor, a gas turbine and a generator, which are operatively connected in series, a heat recovery steam generator operatively connected to the gas turbine, a combustion monitoring device for detecting NOx concentration of an exhaust gas to be exhausted from the gas turbine so as to monitor combustion condition of combustion gas in the gas turbine-combustor, and a gas turbine controller operatively connected to the combustion monitoring device and provided with a NOx value predictor, the combustion monitoring device comprising:

an alarm signal calculation circuit having a NOx sensor disposed on an upstream side of a catalyst disposed to the heat recovery steam generator for detecting the NOx concentration of the exhaust gas, the alarm signal calculation circuit operating an alarm signal based on the NOx concentration detected by the NOx sensor at a time when flashback of the combustion gas in the gas turbine-combustor occurs to reach a premixed combustion zone;

a shutdown calculation circuit for operating a shutdown command at a time when the flashback grows into a prescribed scale; and a flashback-error signal prevention calculation circuit for compensating signal delay of the NOx concentration detected by the NOx sensor in accordance with a predicted NOx concentration value signal from the NOx value predictor.

According to the gas turbine system of the present invention of the structures and characters mentioned above, the alarm signal calculation circuit, the shutdown calculation circuit and the flashback-error signal prevention calculation circuit are integrated in a diagnostic circuit for monitoring occurrence of flashback into the lean-fuel premixing zone of the gas turbine-combustor so as to prevent the flashback-error signal from being generated. It is therefore possible to carry out a safety operation of the gas turbine-combustor.

Furthermore, according to the gas turbine system of the present invention, the shutdown calculation circuit and the delay prevention calculation circuit are integrated in the diagnostic circuit for monitoring occurrence of flashback into the lean-fuel premixing zone of the gas turbine-combustor so as to compensate for a signal delay of the real NOx concentration value signal. It is therefore possible to surely detect the flashback in the gas turbine combustor even during load variation.

The nature and further characteristic features of the present invention will be made more clear from the following descriptions made with reference to the accompanying drawings.

DESCRIPTION OF THE PREFERRED EMBODIMENTS

Preferred embodiments of a gas turbine system according to the present invention will be described hereunder with reference to the accompanying drawings.

Figure 1:
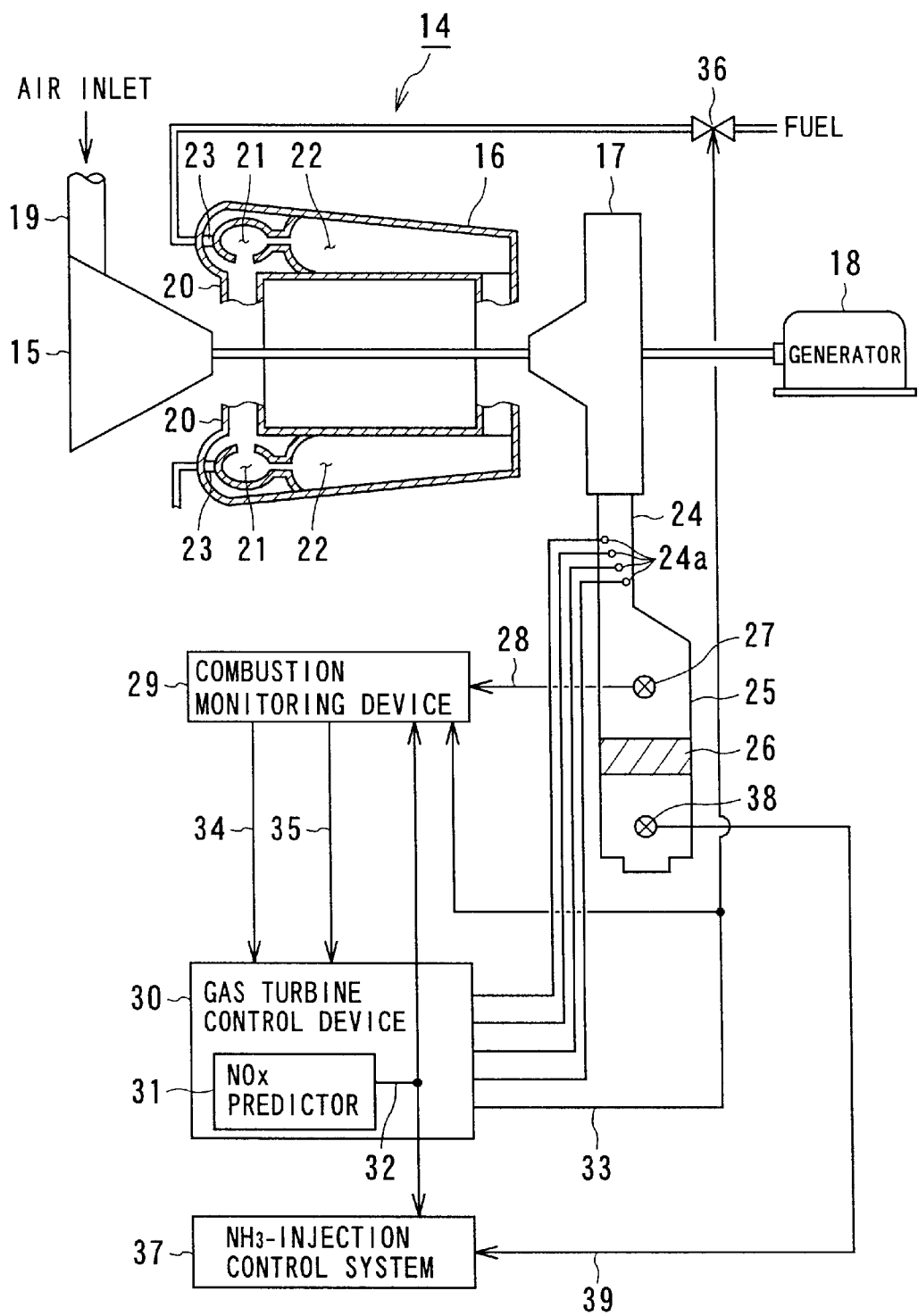
FIG. 1 is a schematic block diagram used to describe a gas turbine system according to an embodiment of the present invention, which is incorporated into a combined cycle power generation system.

FIG. 1 is a schematic block diagram used to describe the gas turbine system according to an embodiment of the present invention, which is incorporated for example into a combined cycle power generation system.

The gas turbine system according to the present invention generally shown as the reference numeral "14" is provided with a compressor 15, a gas turbine-combustor 16, a gas turbine 17 and a generator 18. Air is supplied into the compressor 15 through an air inlet 19. The air is compressed therein and is then supplied into the gas turbine-combustor 16 through an inlet duct 20.

The gas turbine-combustor 16 is divided into a lean-fuel premixing zone 21 and a combustion zone 22. First, fuel enters the lean-fuel premixing zone 21 from a plurality of fuel nozzles 23, 23 to be mixed with air and then the air thus premixed with the lean-fuel burns in the combustion zone 22 to generate a combustion gas.

The combustion gas, which is generated in the combustion zone 22, provides expansive power so as to cause the power generator 18 to drive and then supplied into a heat recovery steam generator 25 through an exhaust gas duct 24.

The exhaust gas duct 24, which connects the gas turbine 17 and the heat recovery steam generator 25 with each other, has a plurality of thermocouples 24a disposed therein, with the result that temperature of the exhaust gas detected by the thermocouples 24a is given to a gas turbine control device 30. The gas turbine control device 30 calculates a fuel gas valve control command 33 to provide an operation signal, taking into consideration the thus detected temperature of the exhaust gas in addition to operation parameters such as pressure, flow rate, humidity, the numbers of revolutions and the like. The resultant operation signal is sent to a combustion monitoring device 29 and a fuel valve 36.

A NOx sensor 27 is disposed on the upstream side of a catalyst 26, which is received in the heat recovery steam generator 25. The NOx sensor 27 outputs a real NOx concentration value signal 28 corresponding to a NOx concentration contained in the exhaust gas supplied from the gas turbine 17 to the exhaust gas duct 24.

In addition to the real NOx concentration value signal 28, both a predicted NOx concentration value signal 32 from a NOx predictor 31, which is integrated in the gas turbine control device 30, and the fuel gas valve control command 33 sent from the gas turbine control device 30 are input to the combustion monitoring device 29. The combustion monitoring device 29 causes a diagnostic circuit described later to judge, through calculation, existence of abnormal combustion such as flashback (backfire) on the basis of the above-mentioned signals 28, 32 and 33 thus input. When it is judged that abnormal combustion exists, the combustion monitoring device 29 sends an alarm signal 34 or a shutdown command 35 to the gas turbine control device 30 and causes the gas turbine control device 30 to send the fuel gas valve control command 33 to the fuel valve 36 to thereby adjust the flow rate of fuel.

The gas turbine control device 30 is provided with an $NH_3$-injection control system 37. The $NH_3$-injection control system 37 is to charge $NH_3$ into the heat recovery steam generator 25 to maintain a lower concentration of NOx contained in the exhaust gas, under reaction with the catalyst 26. There is an inevitable time lag in detection of the real NOx concentration value signal 39 from the NOx sensor 38, which is provided on the downstream side of the catalyst 26. In view of such a time lag, the NOx predictor 31 outputs the predicted NOx concentration value signal 32, which has previously been calculated on the basis of the operation parameters such as pressure, temperature, flow rate, humidity, the numbers of revolutions and the like, so that an amount of $NH_3$ to be charged is calculated with the use of combination of the predicted NOx concentration value signal 32, which has a quick response ability (i.e., which is instantly available), with the real NOx concentration value signal 39 having a high precision of detection.

Figure 2:
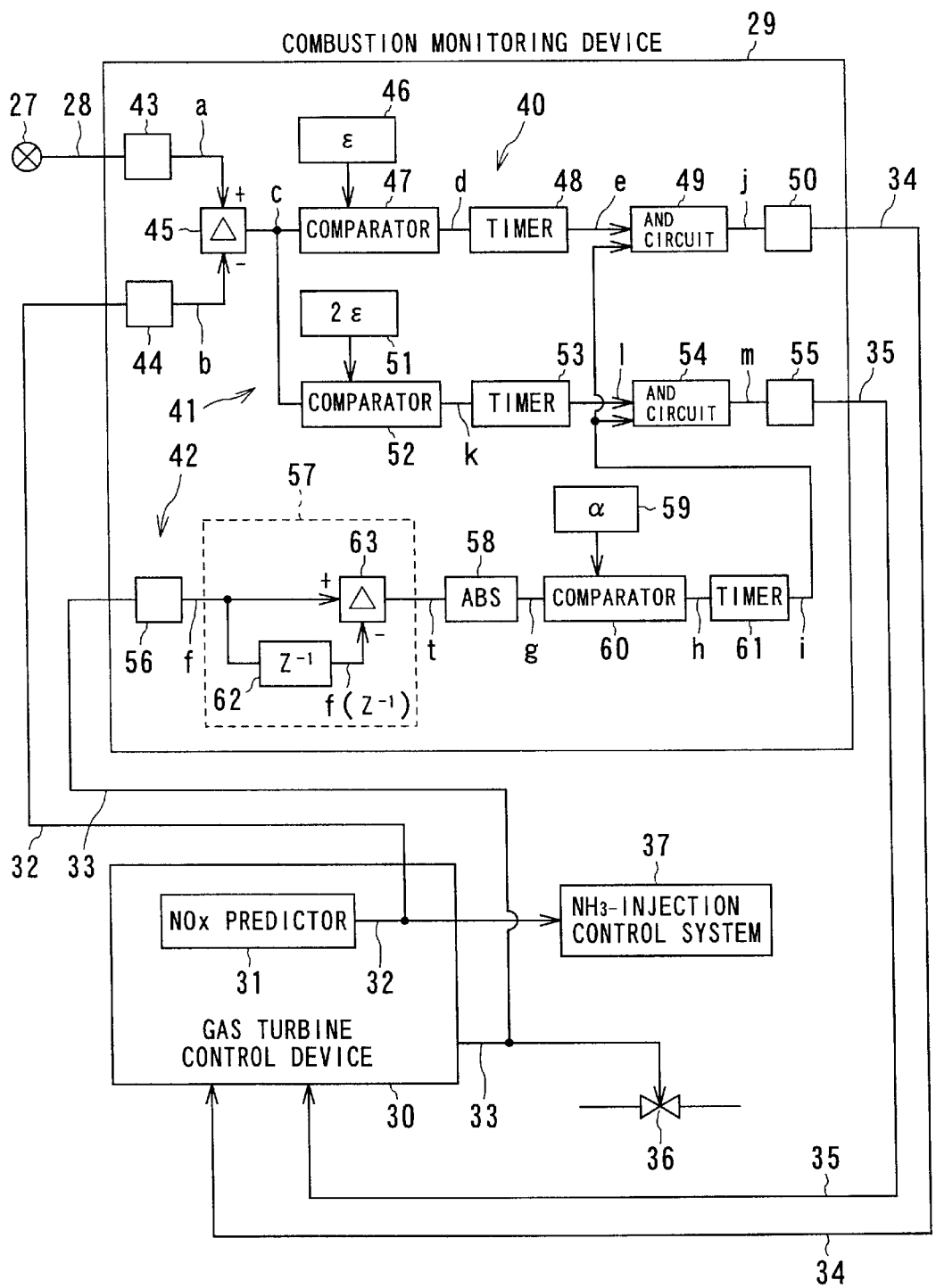
FIG. 2 is a control block diagram illustrating a first embodiment of a diagnostic circuit, which is integrated in a combustion monitoring device of the gas turbine system according to the present invention.

FIG. 2 is a control block diagram illustrating the first embodiment of the diagnostic circuit, which is integrated in the combustion monitoring device 29.

The diagnostic circuit is obtained by combining an alarm signal calculation circuit 40 with a shutdown calculation circuit 41 and a flashback-error signal prevention calculation circuit 42.

The alarm signal calculation circuit 40 is provided with the first and second input portions 43, 44 with built-in analog/digital converters, an arithmetic circuit 45, a first comparator 47 having a first predetermined value setting element 46, a first timer 48, a first AND circuit 49 and a first output portion 50 having a function of contact output.

The shutdown calculation circuit 41 branches off the output side of the arithmetic circuit 45 of the alarm signal calculation circuit 40. The shutdown calculation circuit 41 is provided with a second comparator 52; the second timer 53, a second AND circuit 54 and a second output end portion 55 having a function of contact output, in this order in the flowing direction of the operation signal. The second comparator 52 has a second predetermined value setting element 51, in which there is determined a predetermined set value "$2\epsilon$" that is increased twice as much as a predetermine d set value "$\epsilon$" of the above-mentioned first predetermined value setting element 46.

The flashback-error signal prevention calculation circuit 42 is provided with a third input portion 56 with a built-in analog/digital converter, a differentiating circuit 57, an absolute value converter (ABS gate) 58, a third comparator 60 having a third predetermined value setting element 59 and a third timer 61. The flash back-error signal prevention calculation circuit 42 is connected to a first AND circuit 49 of the alarm signal calculation circuit 40 and a second AND circuit 54 of the shutdown calculation circuit 41.

In the diagnostic circuit having the above-described configuration, the real NOx concentration value signal 28, which is detected by means of the NOx sensor 27 disposed on the upstream side of the catalyst 26 of the heat recovery steam generator 25 as shown in FIG. 1, is converted into a digital signal in the first input portion 43 and then input to the arithmetic circuit 45 as the real NOx concentration value "a".

The predicted NOx concentration value signal 32 from the NOx predictor 31, which is incorporated into the gas turbine control device 30, is converted into a digital signal in the second input portion 44 and then input to the arithmetic circuit 45 as the predicted NOx concentration value "b".

The arithmetic circuit 45 subtracts the NOx concentration value "b" from the real NOx concentration value "a" to obtain a deviation "c".

The predicted NOx concentration value "b" includes an error. In view of this fact, the predetermined set value "$\epsilon$" that is larger than the above-mentioned error is set in the first predetermined value setting element 46. When the deviation "c" between the real NOx concentration value "a" and the predicted NOx concentration value "b" is larger than the set value "$\epsilon$" in the first comparator 47, an output "d" of the first comparator 47 becomes "1" (i.e., the comparator 47 makes a signal to turn on electricity). On the contrary, when the deviation "c" is smaller than the predetermined set value "$\epsilon$", an output "d" of the first comparator 47 becomes "0" (i.e., the compartor 47 does not make a signal to turn on electricity (current no-conduction) (OFF).

When the gas turbine-combustor is kept in the normal combustion state and the fuel consumption is constant, the predicted NOx concentration value "b" becomes substantially identical to the real NOx concentration value "a". As a result, the deviation "c" becomes smaller than the predetermined set value "$\epsilon$" so that the output "d" of the first comparator 47 keeps "0".

When the flashback occurs in the gas turbine-combustor 16 and the NOx concentration increases due to the flashback in the lean-fuel premixing zone 21, the real NOx concentration value "a" becomes larger.

Even when the flashback occurs, there is no variation of the operation parameters of the gas turbine 1, such as temperature, pressure, flow rate and the like. Accordingly, the NOx predictor 31 continues outputting the predicted NOx concentration value "b" in a judged state as a normal combustion. As a result, the deviation "c" becomes larger than the predetermined set value "$\epsilon$" so that the output "d" of the first comparator 47 becomes "1".

In order to detect the fact that the flashback continuously occurs for a prescribed period of time so as to prevent instantaneous disturbance from input value, the output "d" of the fist comparator 47 is input into the first timer 48. Here, there is held a state of "d=1" for a prescribed period of time, and then, the output "e" is sent to the first AND circuit 49 as "1".

The deviation "c" branching off from the output side of the arithmetic circuit 45 is compared with the predetermined set value "$2\epsilon$" from the second predetermined setting element 51 in the second comparator 52. When the deviation "c" exceeds the predetermined set value "$2\epsilon$", the output "k" of the second comparator 52 becomes 1. There is held a state of "k=1" for a prescribed period of time, and then, the output "k" is sent to the second AND circuit 54 as "1".

When load varies excessively so that flow rate of fuel supplied to the gas turbine-combustor 16 varies excessively, the deviation "c" in the arithmetic circuit 45 may become larger due to measurement delay in the NOx sensor 27 with the result that the output "e" and the output "1" from the first timer 48 and the second timer 53 are held in states of "e=1" and "1=1", respectively. More specifically, the arithmetic circuit 45 may judges as if the flashback occurs to process the deviation "c" as an error signal, although the flashback does not occur in the lean-fuel premixing zone of the gas turbine-combustor 16.

According to the embodiment of the present invention in which the above-mentioned aspect is taken into consideration, the operation signal from the flashback-error signal prevention calculation circuit 42 is sent to the first AND circuit 49 and the second AND circuit 54.

The flashback-error signal prevention calculation circuit 42 converts the fuel gas valve control command 33 from the gas turbine control device 30 into a digital signal in the third input portion 56, and send the converted digital signal to the differentiating circuit 57 as the fuel gas valve control command "f". The differentiating circuit 57 has a delay unit 62 and an arithmetic circuit 63. The delay unit 62 outputs the fuel gas valve control command "f" as the fuel gas valve control command "f($z^{-1}$)" of the first previous period. The arithmetic circuit 63 calculates the fuel gas valve control command "f($z^{-1}$)" of the first previous period from the fuel gas valve control command "f". The deviation "t" between the fuel gas valve control command "f($z^{-1}$)" of the first previous period output from the delay unit 62 and the fuel gas valve control command "f($z^{-1}$)" of the first previous period calculated in the arithmetic circuit is input. The deviation "t" is converted into an absolute value in the absolute value converter (ABS gate) 58 and the absolute value is input as a differential value "g (g=|t|)" from the absolute value converter 58 into the third comparator 60.

The third comparator 60 compares the differential value "g" with the predetermined set value "α" from the third predetermined value setting element 59. The third comparator 60 keeps the output "h" as "1" when the differential value "g" is smaller than the predetermined set value "α", and alternatively keeps the output "h" as "0" when the differential value "g" is larger than the predetermined set value "α".

In the embodiment of the present invention, when flow rate of fuel varies excessively along with the load variation, the difference between the fuel gas valve control command "f" and the fuel gas valve control command "f($z^{-1}$)" of the first previous period becomes larger, resulting in increase in the differential value "g" so that the output "h" is kept as "0". When a constant loaded operation is carried out, the difference between the fuel gas valve control command "f" and the fuel gas valve control command "f($z^{-1}$)" of the first previous period becomes smaller, resulting in decrease in the differential value "g" so that the output "h" is kept as "1". In case of the constant loaded operation, the output "h" from the comparator 60 is held in a state of "h=1" for a period of time predetermined in the third timer 61 and the output "i" is sent as "1" to the first AND circuit 49 of the alarm signal calculation circuit 40 and the second AND circuit 54 of the shutdown calculation circuit 41, in order to prevent disturbance from input value.

The alarm signal calculation circuit 40 regards the output "e" from the first timer 48 as the normal signal of "1" (wherein the real NOx concentration value "a" is larger than the predicted NOx concentration value "b"), provided that the output "i" from the flashback-error signal prevention calculation circuit 42 has completely been sent to the first AND circuit 49, and then, the circuit 40 causes the first output portion 50 to send the alarm signal that the flashback occurs in the lean-fuel premixing zone 21 of the gas turbine-combustor 16 to the gas turbine control device 30, thus giving information to an operator through an interface (i.e., a display device), not shown.

The shutdown calculation circuit 41 regards the output "1" from the second timer 53 as the normal signal of "1", provided that the output "i" from the flashback-error signal prevention calculation circuit 42 has completely been sent to the second AND circuit 54, and then, the circuit 41 causes the second output portion 55 to send the shutdown command 35 that the flashback violently occurs and grows into a large scale in the lean-fuel premixing zone 21 of the gas turbine-combustor 16 to the gas turbine control device 30, thus shutting down the gas turbine system 14. With respect to distinction between the shutdown and the alarm, the set value "2ε" of the second predetermined value setting element 51 of the shutdown calculation circuit 41 is increased twice as much as the predetermined set value "ε" of the first predetermined value setting element 46 of the alarm signal calculation circuit 40.

Figure 3:
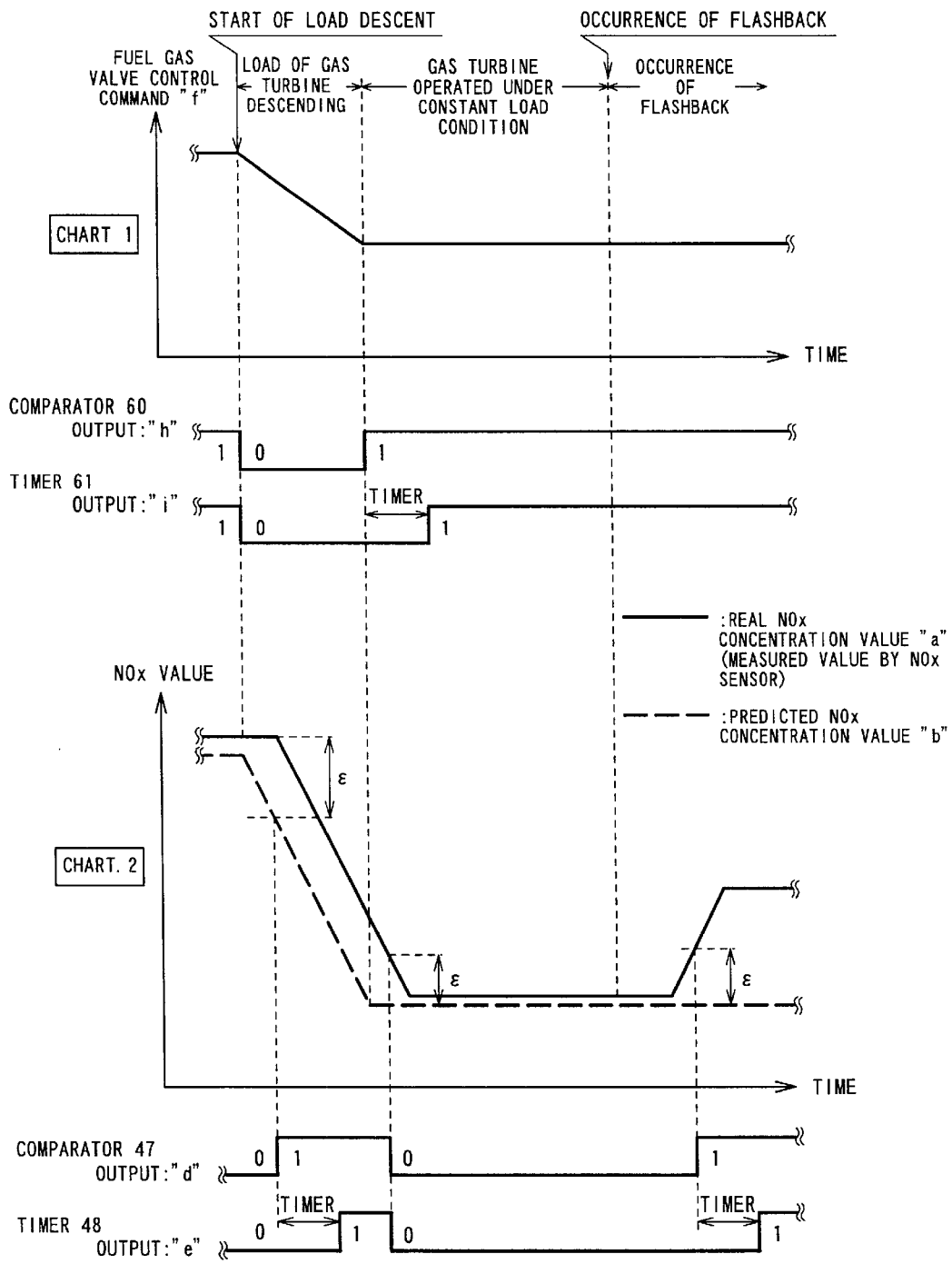
FIG. 3 is a chart in which a comparison is made between behavior of a fuel gas valve control command from the diagnostic circuit of the gas turbine system according to the present invention and a real NOx concentration value, and more specifically, Chart 1 illustrates behavior of the fuel gas valve control command in three phases into which operation of the gas turbine system is classified, i.e., a first phase in which the gas turbine system is operated under reduced load conditions, a second phase in which the plant is operated under a constant load condition and a third phase in which flashback is occurring, and Chart 2 illustrates deviations between real NOx concentration values and predicted NOx concentration values in correspondence to the above-mentioned three phases.

FIG. 3 is a chart in which a comparison is made between behavior of the fuel gas valve control command "f" of the flashback-error signal prevention calculation circuit 42, which is converted into a digital signal, the real NOx concentration value, and more specifically, Chart 1 illustrates a behavior of the fuel gas valve control command "f" in three phases into which the operation of the gas turbine system 14 is classified, i.e., the first phase in which the gas turbine system 14 is operated under a decreased load condition, the second phase in which the plant 14 is operated under a constant load and the third phase in which the flashback is occurring, and Chart 2 illustrates deviations between real NOx concentration values "a" (i.e., the NOx concentration values measured by means of the NOx sensors 27) and predicted NOx concentration values "b" in correspondence to the above-mentioned three phases.

In Chart 1 of FIG. 3, when load of the gas turbine system 14 decreases, the fuel gas valve control command "f" also decreases. The predicted NOx concentration value "b" shown in Chart 2 also decreases in correspondence to the above-mentioned fact.

On the contrary, the real NOx concentration value "a", which has a slow response with a long time lag due to measurement delay in the NOx sensor 27 as shown in Chart 2, is kept as a large value for a while and then starts to decrease. As a result, deviation between the real NOx concentration value "a" and the predicted NOx concentration value "b" gradually increases. When the deviation becomes identical to or larger than the predetermined set value "ε", the output "d" of the first comparator 47 as shown in FIG. 2 becomes "1". The output "e" of the first timer 48 becomes "1" after the lapse of prescribed period of time.

The fuel gas valve control command "f" of the flashback-error signal prevention calculation circuit 42 varies excessively during the decreasing in the load so that the deviation (i.e., the differential value "g") between the fuel gas valve control command "f", which is converted into the digital signal in the third input portion 56 as shown in FIG. 2, and the fuel gas valve control command "f($z^{-1}$)" of the first previous period becomes larger. As a result, the output "h" of the third comparator 60 is kept as "0" and the output "i" of the third timer 61 is also kept as "0".

In this case, the output "i" of the third timer 61 of the flashback-error signal prevention calculation circuit 42 is kept as "0". Even when the output "e" of the first timer 48 of the alarm signal calculation circuit 40 is kept as "1", requirements are not satisfied in the first AND circuit 41 so that the output "j" is kept as "0". Accordingly, the alarm signal calculation circuit 40 does not generate and send any alarm signal 34 to the gas turbine control device 30. More specifically, a large deviation "ε" is generated between the real NOx concentration value "a" and the predicted NOx concentration value "b" due to the measurement delay in the NOx sensor 27 during the variation in load, with the result that the error signal of flashback, which is calculated in the alarm signal calculation circuit 40, is prevented from being sent, through the calculation signal from the flashback-error signal prevention calculation circuit 42.

When the load of the gas turbine system 14 becomes constant, the fuel gas valve control command "f" is kept as a constant value as shown in Chart 1. As a result, the above-mentioned differential value "g" becomes zero so that the output "h" of the third comparator 60 becomes "1".

The deviation "ε" between the real NOx concentration value "a" and the predicted NOx concentration value "b" has a large value immediately after the load has become constant. The output "i" of the third timer 61 becomes "1" after the output "h=1" is kept for a prescribed period of time, in order to prevent the error signal of flashback from being sent. The output "i=1" is kept until the load varies.

When the load of the gas turbine system 14 becomes constant, the predicted NOx concentration value becomes constant. In this case, the real NOx concentration value "a" has a slow response causing a time lag so that the deviation "ε" between the real NOx concentration value "a" and the predicted NOx concentration value "b" is large. However, the output of the third timer 61 of the flashback-error signal prevention calculation circuit 42 as shown in FIG. 3 is still kept as "0" during the above-mentioned period of time, with the result that the output "j" of the first AND circuit 49 of the alarm signal calculation circuit 40 is kept as "0", leading to no detection of flashback.

When the real NOx concentration value "a" approaches the predicted NOx concentration value "b" after a lapse of time and the deviation "ε" becomes smaller, the output "d" of the first comparator 47 and the output "e" of the first timer 48 become "0", leading to no detection of flashback.

In this case, if flashback occurs for certain reasons and the deviation "ε" between the real NOx concentration value and the predicted NOx concentration value becomes larger, the output "d" of the first comparator 47 becomes "1" and the output "e" of the first timer 48 also becomes "1" after a lapse of prescribed period of time. When both the output "i" of the third timer 61 and the output "e" of the first timer 48 become "1", the output "j" of the first AND circuit 49 becomes "1" so that the alarm signal 34 is sent to the gas turbine control device 30 through the first output end portion 50, thus informing an operator of occurrence of flashback.

When the flashback grows into a large scale (although this case is not illustrated in FIG. 3) so that the real NOx concentration value "a" exceeds the predetermined set value "2ε" of the second predetermined value setting element 51 while passing through the second comparator 52 as shown in FIG. 2, the shutdown calculation circuit 41 operates, like the above-described alarm signal calculation circuit 40, the shutdown command 35, provided that the calculation signals from the flashback-error signal prevention calculation circuit 42, are sent to the second AND circuit 54. Such a shutdown command 35 is sent to the gas turbine control device 30, thus shutting down the gas turbine system 14 so as to prevent a burnout accident of equipment.

According to the above-described embodiment of the present invention, the gas turbine system has a device for calculating signals for an alarm and shutdown of the operation of the plant on the basis of the real NOx concentration value measured from the exhaust gas and the predicted NOx concentration value, which compensates for measurement delay concerning the real NOx concentration value, and a device for preventing an error signal of flashback of the combustion gas into the lean-fuel premixing zone 21, during the load variation. It is therefore possible to monitor the flashback of the combustion gas into the lean-fuel premixing zone 21 to carry out a safety operation of the gas turbine-combustor 16.

According to the above-described embodiment of the present invention, the gas turbine system has additionally a device for monitoring the flashback of the combustion gas into the lean-fuel premixing zone 21 when operation is carried out under a constant load. It is therefore possible to securely prevent an incorrect detection when there exists a large deviation between the real NOx concentration value and the predicted NOx concentration value during the load variation.

Figure 4:
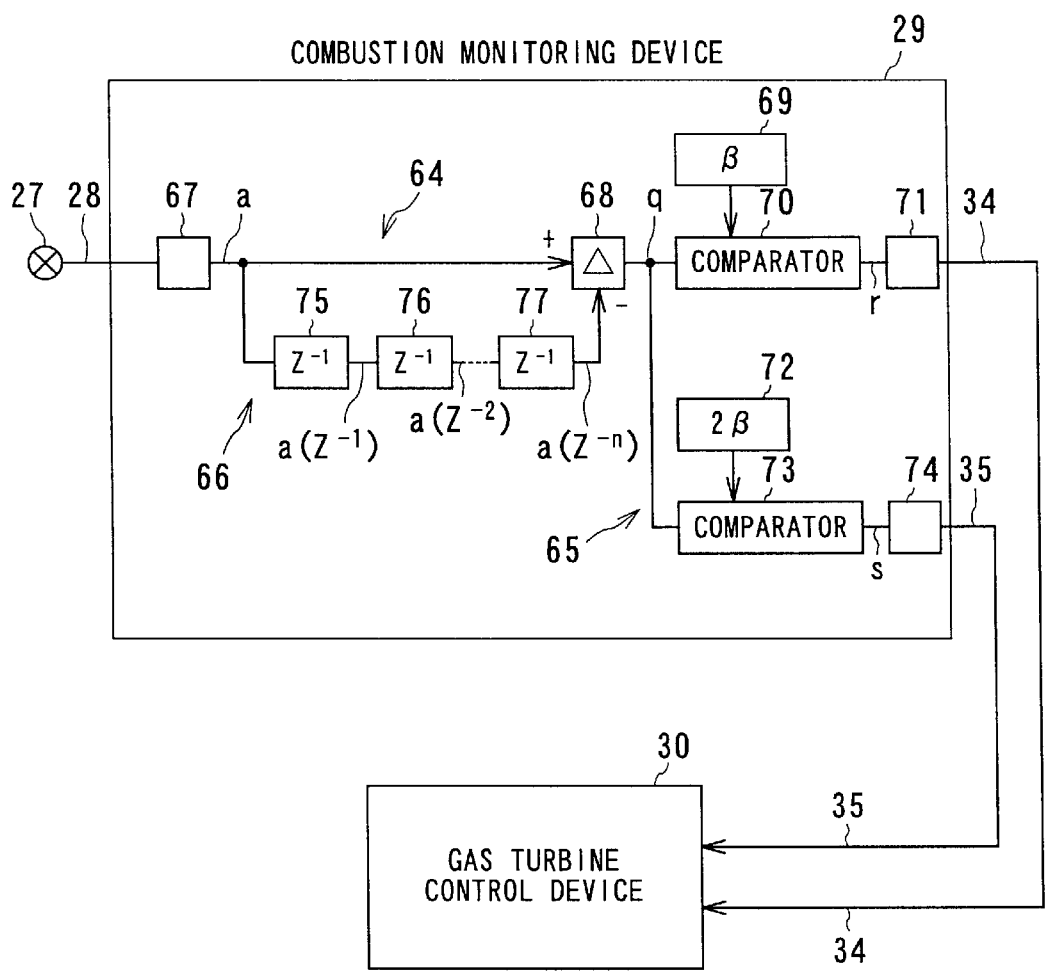
FIG. 4 is a block diagram illustrating a second embodiment of a diagnostic circuit, which is integrated in the combustion monitoring device of the gas turbine system according to the present invention.

FIG. 4 is a block diagram illustrating the second embodiment of the diagnostic circuit, which is integrated in the combustion monitoring device of the gas turbine system according to the present invention. The same components as those of the first embodiment have the same reference numbers.

The diagnostic circuit of this embodiment is obtained by combining an alarm signal calculation circuit 64 with a shutdown calculation circuit 65 and a delay prevention calculation circuit 66.

The alarm signal calculation circuit 64 is provided with a fourth input portion 67, an arithmetic circuit 68, a fourth comparator 70 having a fourth predetermined value setting element 69, and a fourth output portion 71 having a function of contact output.

The shutdown calculation circuit 65 branches off from the output side of the arithmetic circuit 68 of the alarm signal calculation circuit 64. The shutdown calculation circuit 65 is provided with a fifth comparator 73 and a fifth output portion 74 having a function of contact output, in this order in the flowing direction of the operation signal. The fifth comparator 73 has a fifth predetermined value setting element 72, in which there is determined a predetermined set value "2β" that is increased twice as much as a set value "β" of the above-mentioned fourth predetermined value setting element 69.

The delay prevention calculation circuit 66 branches off from the output side of the fourth input portion 67 of the alarm signal calculation circuit 64. The delay prevention calculation circuit 66 is provided with a first delay unit 75, a second delay unit 76 and an n-th delay unit 77, which are disposed in this order in the flowing direction of the operation signal in the connection route to the arithmetic circuit 68. The first delay unit 75 calculates a NOx concentration value "$a(z^{-1})$" of the first previous period of the real NOx concentration value "a", which has been converted into a digital signal in the fourth input portion 67. The second delay unit 76 calculates a NOx concentration value "$a(z^{-2})$" of the second previous period of the above-mentioned real NOx concentration value "a". The n-th delay unit 77 calculates a NOx concentration value "$a(z^{-n})$" of the n-th previous period of the above-mentioned real NOx concentration value "a".

In the diagnostic circuit having the above-described configuration, the real NOx concentration value signal 28, which is detected by means of the NOx sensor 27, is converted into a digital signal in the fourth input portion 67 of the alarm signal calculation circuit 64 and then input to the arithmetic circuit 68 as the current real NOx concentration value "a".

The current real NOx concentration value "a", which has been converted into the digital signal in the fourth input portion 67, is calculated into the NOx concentration value "$a(z^{-1})$" of the first previous period in the first delay unit 75 of the delay prevention calculation circuit 66, then calculated into the NOx concentration value "$a(z^{-2})$" of the second previous period in a second delay unit 76, further calculated into the NOx concentration value "$a(z^{-(n-1)})$" of the next previous period on after another, and finally calculated into the NOx concentration value "$a(z^{-n})$" of the n-th previous period in the n-th delay unit 77.

The arithmetic circuit 68 subtracts the NOx concentration value "$a(z^{-n})$" of the n-th previous period from the current real NOx concentration value "a" to provide a range of variation (deviation) "q" of the real NOx concentration.

Figure 5:
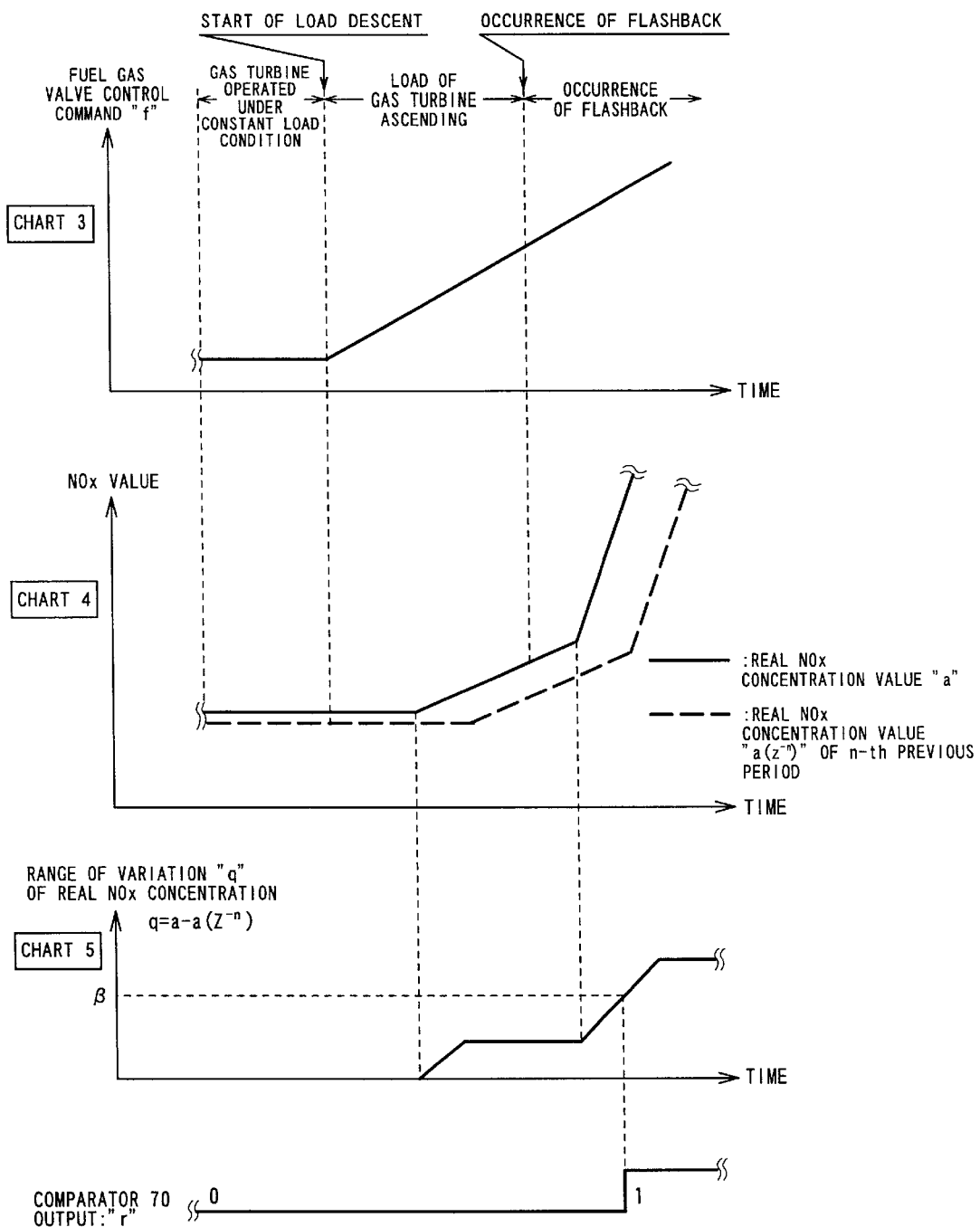
FIG. 5 is a chart in which a comparison is made between behavior of the fuel gas valve control command from the diagnostic circuit of the gas turbine system according to the present invention and a real NOx concentration value, and more specifically, Chart 3 illustrates behavior of the fuel gas valve control command in three phases into which the operation of the gas turbine system is classified, i.e., a fourth phase in which the gas turbine system is operated under a constant load condition, a fifth phase in which the plant is operated increased load conditions and a sixth phase in which flashback is occurring, Chart 4 illustrates deviations between real NOx concentration values and real NOx concentration values of the previous periods of "n-th" in correspondence to the above-mentioned three phases and Chart 5 illustrates behavior of a range of variation of a real NOx concentration value, which is a deviation between the real NOx concentration value and the real NOx concentration value of the previous periods of "N-th"
Figure 6:
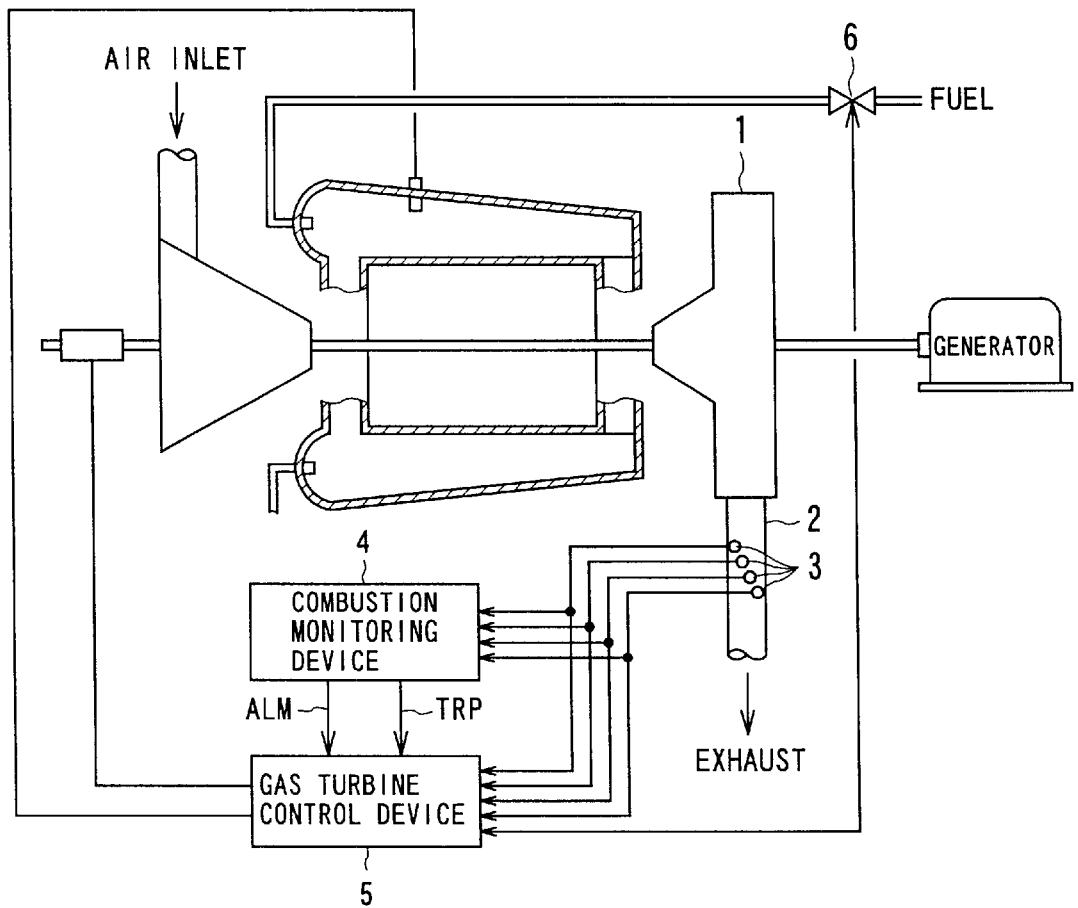
FIG. 6 is a schematic block diagram used to describe a fuel monitoring system of the conventional gas turbine system.
Figure 7:
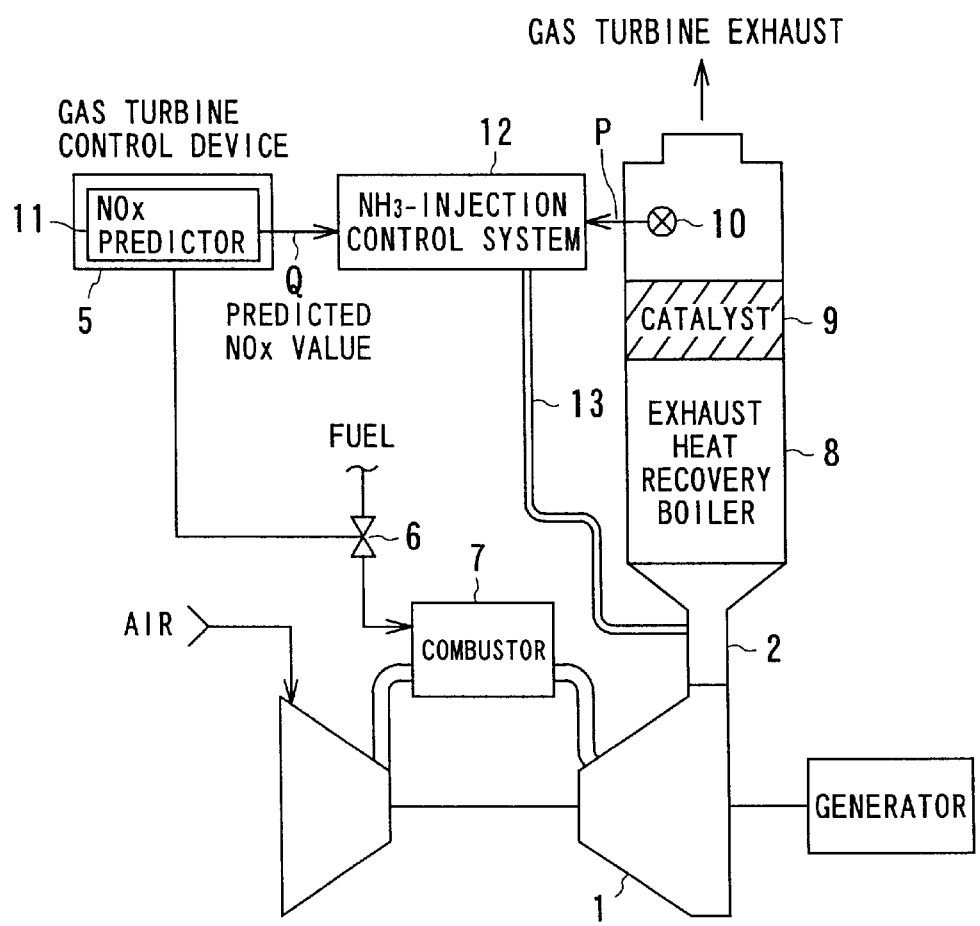
FIG. 7 is a control block diagram illustrating a NOx control device of the conventional combined cycle power generation system.

When the gas turbine system 14 is operated under a constant load condition, the fuel gas valve control command "f" from the gas turbine control device 30 is constant as shown in Chart 4 of FIG. 5. Accordingly, the range of variation "q" of the real NOx concentration output from the arithmetic circuit 68 as shown in FIG. 5 becomes zero so that an output "r" from the fourth comparator 70 is "0". More specifically, in such a case, no alarm signal 34 is sent from the alarm signal calculation circuit 64 to the gas turbine control device 30.

When the gas turbine system 14 is operated under an increased load condition, all the above-mentioned fuel gas valve control command "f" as shown in Chart 3 of FIG. 5, the real NOx concentration value "a" and the NOx concentration value "$a(z^{-n})$" of the n-th previous period, which are shown in Chart 4 of FIG. 5 and the range of variation "q" of the real NOx concentration as shown in Chart 5 of FIG. 5 increase. The output "r" from the fourth comparator 70 is however "0" unless these value exceed the set value β from the fourth predetermined value setting element 69 as shown in FIG. 5. Accordingly, in such a case, no alarm signal 34 is also sent from the alarm signal calculation circuit 64 to the gas turbine control device 30.

When flashback occurs for certain reasons in the lean-fuel premixing zone 21 during operation of the gas turbine system under an increased load condition, the range of variation "q" of the real NOx concentration increases along with the occurrence of flashback. When the range of variation "q" of the real NOx concentration exceeds the set value "β" from the fourth predetermined value setting element 69 as shown in FIG. 4, the output of the fourth comparator 70 becomes "1". As a result, the flashback is detected and the alarm signal 34 is sent to the gas turbine control device 30 through the fourth output portion 71.

When the flashback grows into a large scale so that the range of variation "q" of the real NOx concentration exceeds the set value "2β" of the fifth predetermined value setting element 72, the output of the fifth comparator 73 becomes "1" with the result that the shutdown command 35 is sent to the gas turbine control device 30 through the fifth output portion 74.

According to the embodiment of the present invention, the shutdown calculation circuit 65 and the delay prevention calculation circuit 66 are combined with the alarm signal calculation circuit 64, and there is provided the device for calculating the range of variation "q" of the real NOx concentration, while compensating the signal delay of the real NOx concentration value calculated in the alarm signal calculation circuit 64 and for outputting the alarm signal or the shutdown command when the range of variation "q" of the real NOx concentration exceeds the prescribed value. It is therefore possible to securely detect flashback in the gas turbine-combustor even during the load variation.

It is to be noted that the present invention is not limited to the described embodiment and many other changes and modifications may be made without departing from the scopes of the appended claims.

What is claimed is:

1. A gas turbine system which comprises a compressor, a gas turbine-combustor, a gas turbine and a generator, which are operatively connected in series, a combustion monitoring device for detecting NOx concentration of an exhaust gas to be exhausted from the gas turbine so as to monitor combustion condition of the combustion gas in the gas turbine-combustor, and a gas turbine controller operatively connected to the combustion monitoring device and provided with a NOx value predictor, said combustion monitoring device comprising:

an alarm signal calculation circuit for operating an alarm signal based on the NOx concentration detected from the exhaust gas at a time when flashback of the combustion gas in the gas turbine-combustor occurs to reach a premixed combustion zone;

a shutdown calculation circuit for operating a shutdown command when said flashback grows into a prescribed scale; and a flashback-error signal prevention calculation circuit for compensating signal delay of the NOx concentration detected from the exhaust gas in accordance with a predicted NOx concentration value signal from the NOx value predictor.

2. A gas turbine system according to claim 1, wherein said alarm signal calculation circuit comprises an arithmetic circuit for comparing a real NOx concentration value signal detected from the exhaust gas with the predicted NOx concentration value from the NOx value predictor so as to make a calculation, a comparator for performing a current conduction at a time when an operation signal from the arithmetic circuit exceeds a predetermined set value, and an AND circuit for operating the alarm signal when the operation signal from the comparator coincides with an operation signal from the flashback-error signal prevention calculation circuit.

3. A gas turbine system according to claim 1, wherein said shutdown calculation circuit comprises an arithmetic circuit for comparing a real NOx concentration value signal detected from the exhaust gas with the predicted NOx concentration value from the NOx value predictor so as to make a calculation, a comparator branching off from an output side of the arithmetic circuit for making a signal at a time when an operation signal from the arithmetic circuit exceeds a predetermined set value, and an AND circuit for operating the shutdown command at a time when the operation signal from the comparator coincides with an operation signal from the flashback-error signal prevention calculation circuit.

4. A gas turbine system according to claim 1, wherein said flashback-error signal prevention calculation circuit comprises a differentiator for making a calculation in response to a fuel gas valve control command from the gas turbine controller, a comparator for making a signal at a time when an operation signal from the differentiator exceeds a predetermined set value, and a timer for holding an operation signal from the comparator by a predetermined period of time.

5. A gas turbine system according to claim 1, wherein both the alarm signal from the alarm signal calculation circuit and the shutdown command signal from the shutdown calculation circuit are generated during a prescribed loaded operation.

6. A gas turbine system according to claim 1, wherein said gas turbine controller is provided with an NH3 injection control system.

7. A gas turbine system which comprises a compressor, a gas turbine-combustor, a gas turbine and a generator, which are operatively connected in series, a combustion monitoring device for detecting NOx concentration of an exhaust gas to be exhausted from the gas turbine so as to monitor combustion condition of combustion gas in the gas turbine-combustor, and a gas turbine controller operatively connected to the combustion monitoring device, said combustion monitoring device comprising:
an alarm signal calculation circuit for operating an alarm signal based on the NOx concentration detected from the exhaust gas at a time when flashback of the combustion gas in the gas turbine-combustor occurs to reach a premixed combustion zone;
a shutdown calculation circuit for operating a shutdown command at a time when said flashback grows into a prescribed scale; and
a delay prevention calculation circuit for calculating NOx concentrations of a plurality of previous periods of all previous periods of a current NOx concentration detected from the exhaust gas so as to compensate signal delay of the current NOx concentration.

8. A gas turbine system according to claim 7, wherein said alarm signal calculation circuit comprises an arithmetic circuit for comparing the current NOx concentration value signal detected from the NOx concentrations of the previous periods calculated by the delay prevention calculation circuit to calculate a range of variation of a real NOx concentration, and a comparator for making a signal to send the alarm signal at a time when a calculated range of variation of the real NOx concentration exceeds a predetermined set value.

9. A gas turbine system according to claim 7, wherein said delay prevention calculation circuit is branched off from an output side of an input of the alarm signal calculation circuit and is connected to the calculation element of the alarm signal calculation circuit.

10. A gas turbine system according to claim 7, wherein said delay prevention calculation circuit includes a plurality of delay units for calculating NOx concentrations of a plurality of previous periods of all the previous periods of a current NOx concentration detected from the exhaust gas.

11. A gas turbine system according to claim 7, wherein both the alarm signal from the alarm signal calculation circuit and the shutdown command signal from the shutdown calculation circuit are generated during a prescribed loaded operation.

12. A gas turbine system according to claim 7, wherein said gas turbine controller is provided with an NH3 injection control system.

13. A gas turbine system which comprises a compressor, a gas turbine-combustor, a gas turbine and a generator which are operatively connected in series, a heat recovery steam generator operatively connected to the gas turbine, a combustion monitoring device for detecting NOx concentration of an exhaust gas to be exhausted from the gas turbine so as to monitor combustion condition of combustion gas in the gas turbine-combustor, and a gas turbine controller operatively connected to the combustion monitoring device and provided with a NOx value predictor, said combustion monitoring device comprising:
an alarm signal calculation circuit having a NOx sensor disposed on an upstream side of a catalyst disposed to the heat recovery steam generator for detecting the NOx concentration of the exhaust gas, said alarm signal calculation circuit operating an alarm signal based on the NOx concentration detected by said NOx sensor at a time when flashback of the combustion gas in the gas turbine-combustor occurs to reach a premixed combustion zone;
a shutdown calculation circuit for operating a shutdown command at a time when said flashback grows into a prescribed scale; and
a flashback-error signal prevention calculation circuit for compensating signal delay of the NOx concentration detected by said NOx sensor in accordance with a predicted NOx concentration value signal from the NOx value predictor.

* * * * *

UNITED STATES PATENT AND TRADEMARK OFFICE
CERTIFICATE OF CORRECTION

PATENT NO. : 6,530,207 B2  Page 1 of 1
DATED : March 11, 2003
INVENTOR(S) : Tobo et al.

It is certified that error appears in the above-identified patent and that said Letters Patent is hereby corrected as shown below:

<u>Title page, Item [54] and Column 1, line 2,</u>
The Title is incorrect. The Title should read as follows:

-- [54]  GAS TURBINE SYSTEM HAVING FLASHBACK PROTECTION --

Signed and Sealed this

Twenty-fourth Day of June, 2003

JAMES E. ROGAN
*Director of the United States Patent and Trademark Office*